(No Model.) 2 Sheets—Sheet 1.

J. B. SUFFERN.
RAILWAY SWITCH.

No. 406,244. Patented July 2, 1889.

WITNESSES:
Donn Twitchell
C. Sedgwick

INVENTOR:
J. B. Suffern
BY Munn & Co.
ATTORNEYS.

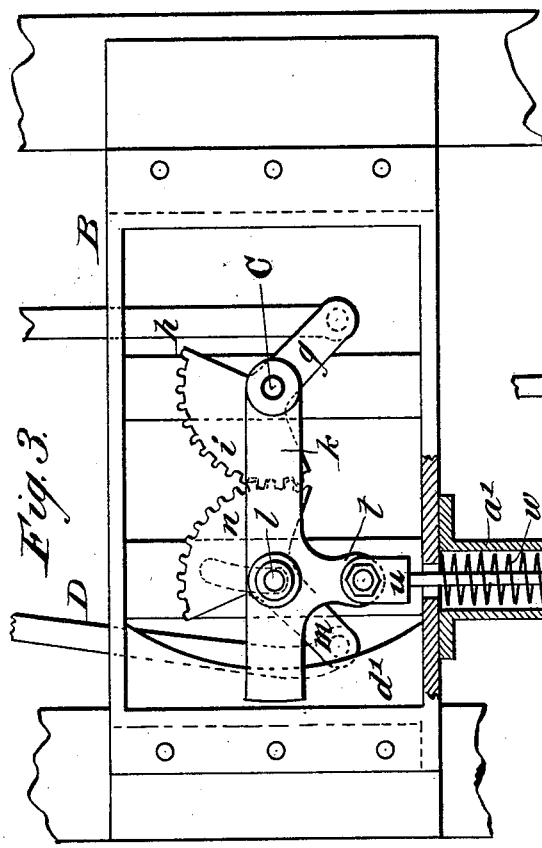
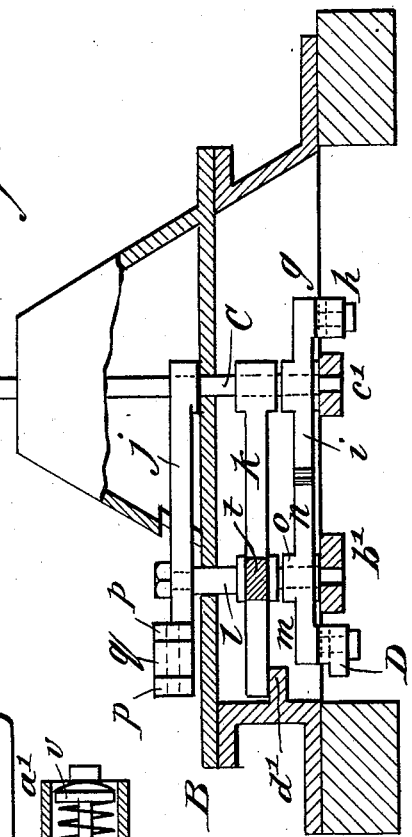
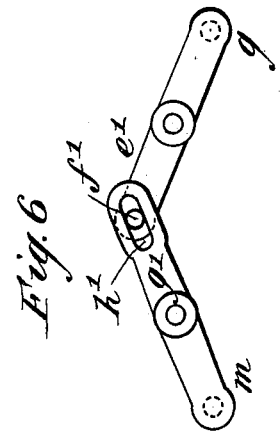
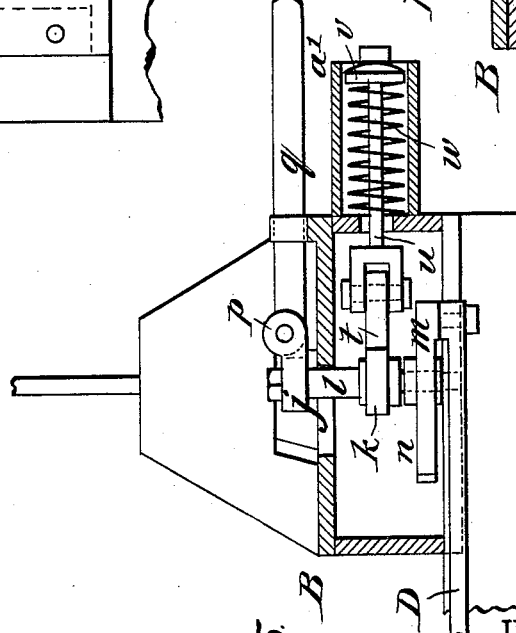

UNITED STATES PATENT OFFICE.

JAMES B. SUFFERN, OF HILLBURN, NEW YORK.

RAILWAY-SWITCH.

SPECIFICATION forming part of Letters Patent No. 406,244, dated July 2, 1889.

Application filed November 1, 1888. Serial No. 289,714. (No model.)

*To all whom it may concern:*

Be it known that I, JAMES B. SUFFERN, of Hillburn, in the county of Rockland and State of New York, have invented a new and Improved Railway-Switch, of which the following is a specification, reference being had to the annexed drawings, forming a part thereof, in which—

Figure 1:
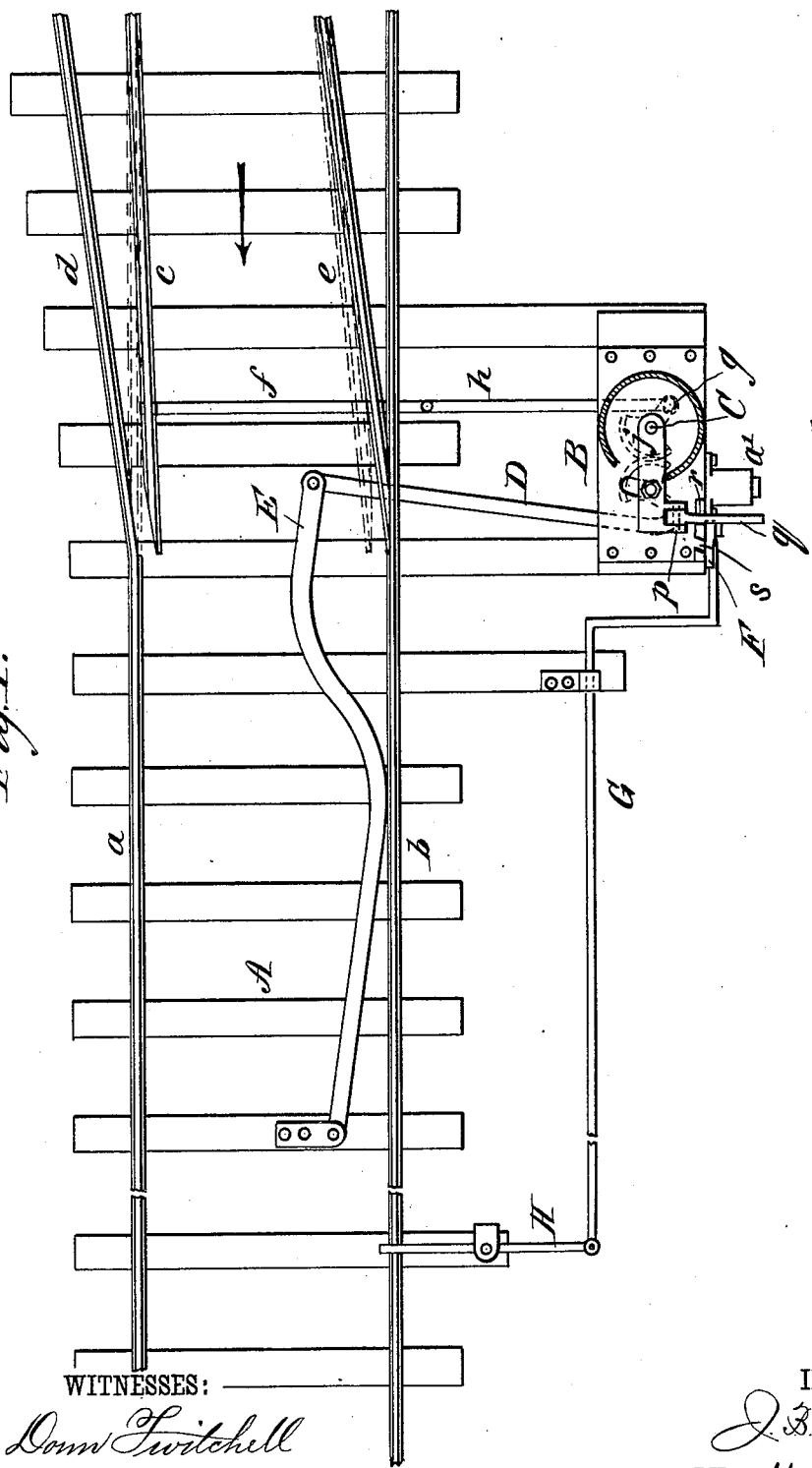
Figure 2:
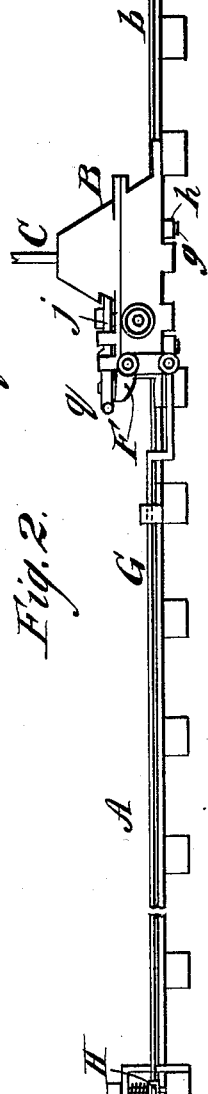

Figure 1 is a plan view of my improved railway-switch. Fig. 2 is a side elevation. Fig. 3 is a plan view of the base of the switch-stand with the top removed. Fig. 4 is a side elevation, partly in section, of the base and switch-stand. Fig. 5 is a vertical transverse section, and Fig. 6 is a modification of the auxiliary mechanism.

Similar letters of reference indicate corresponding parts in all the views.

The object of my invention is to provide attachments for the ordinary switch and spring-switch stand, whereby the switch will be set so as to render the main track continuous by the action of the locomotive or car wheels.

My invention consists in the combination, with the vertical shaft of the switch-stand, of a lever connected with the switch-stand shaft and with a track-lever, and arranged to spring the switch-stand by the engagement of the wheels with the track-lever, all as hereinafter more fully described.

The main track A is formed of the track-rails $a\ b$ and the switch-rail $c$, and the side track is formed of the rail $d$ and switch-rail $e$, the switch-rails $c\ e$ being connected together by the bar $f$, and with the crank $g$ of the switch-stand B by the rod $h$, so that by turning the crank-shaft C of the switch-stand the switch-rails $c\ e$ will be moved in the usual way.

In the switch-stand as usually made the crank $g$ is formed integrally with the shaft C; but in my improvement I preferably form the crank $g$ separate from the said shaft and attach it thereto by keying or otherwise. Upon the boss of the crank $g$ is formed a toothed sector $i$, and upon the vertical shaft C are pivoted the arms $j\ k$, in which is journaled a shaft $l$, carrying upon its lower end a crank $m$ and a toothed sector $n$, formed integrally with the boss $o$, the said toothed sector $n$ being arranged to engage the toothed sector $i$. The arm $j$ is provided with ears $p$, between which is pivoted the lever-handle $q$, the said handle reaching beyond the base of the switch-stand B, and is adapted to drop into the notches $r\ s$ between projections extending upwardly from the base. A rod D, received on the crank $m$, is pivotally connected with one end of the track-lever E, arranged between the main-track rails $a\ b$ and in proximity to the rail $b$, with the curved side thereof adjoining the said track-rail. The opposite end of the track-lever E is pivoted to one of the ties.

The arm $k$ is provided with an ear $t$, which is pivotally connected with a rod $u$, extending rearwardly through the base of the switch-stand, and provided at its outer extremity with a collar $v$, between which and the base of the switch-stand is placed a spiral spring $w$, the said spring being inclosed by a barrel $a'$, attached to the switch-stand.

To one side of the switch-stand B is pivoted a right-angled lever F, the shorter arm of which extends under the notch $s$, the longer arm being extended downwardly and pivotally connected with the rod G, extending to a distant point and connected with the track-lever H, one arm of which reaches over toward the track A and into the path of the locomotive.

When a train advances on the main track toward the switch in the direction indicated by the arrow, the switch-rails are moved by the action of the car-wheels in the usual way into the position shown in dotted lines, and the train follows the main track. When a train approaches from the opposite direction, the engagement of the locomotive with the lever H releases the lever-arm $q$ and allows the arms $j\ k$ to be drawn back by the spring $w$, thus carrying the sector $n$ and crank $m$ away from the track and bringing the track-lever E into proximity to the rail $b$, so that when the flanges of the locomotive or car wheels pass between the track-lever E and the rail $b$ the track-lever will be moved away from the rail $b$, thus turning the crank $m$ and sector $n$, the latter communicating motion to the sector $i$ and causing the crank $g$ to move so as to throw the switch-rails $c\ e$ into the position indicated by dotted lines, thereby permitting the train to keep to the main track. The arms $j\ k$ are held in position by the engagement of the lever-arm $q$ with the notch $r$.

By my improvement the danger of running from the main track to a siding is lessened, while it is rendered possible for the train to take the siding by shifting the lever-arm $q$ from the notch $r$ to the notch $s$, thus moving the track-lever E away from the rail $b$, so that it is not engaged by the wheels of the locomotive or cars. When the train is to pass to the siding, a switchman will first operate the lever-arm $g$, as just stated, and then move the lever H away from the track, or the train will be stopped to allow one of the hands to operate the said parts. The engineer has no control over the switch mechanism, which is automatic in every respect except in the instance just mentioned. The lower ends of the shafts C $l$ are journaled in cross-bars $b'$ $c'$, and the arm $k$ is provided with a guide $d'$, attached to or formed integrally with the base of the stand.

In Fig. 6 is shown a device in which the toothed sector $i$ is replaced by the arm $e'$, provided with the stud $f'$, and the toothed sector $n$ is replaced by an arm $g'$, provided with a slot $h'$, in which the pin $f'$ is inserted. Arranged in this manner, motion is imparted from the crank $m$ to the crank $g$ through the said arms $g'$ $e'$.

In lieu of the rod G, I may employ a wire rope, chain, or equivalent device.

Having thus described my invention, I claim as new and desire to secure by Letters Patent—

1. The combination, with the switch-bar and the vertical crank-shaft for operating it, of horizontal arms pivoted at their inner ends, one above the other, to said crank-shaft, a vertical shaft journaled in said arms and geared to the vertical crank-shaft, a track-lever to be operated by a passing train and connected with said vertical shaft, and means for throwing the said pivoted arms toward the track to move the lever away from the rail, substantially as set forth.

2. In an automatic switch, the combination, with the switch-rails $c$ $e$, the stand B, provided with the crank-shaft C, and the connections between the switch-rails and the crank-shaft, of the track-lever E, the connecting-rod D, the cranks $m$ $g$, and connections intermediate between the cranks $m$ $g$, substantially as specified.

3. In an automatic switch, the combination of the switch-rails $c$ $e$, the crank $g$, provided with the toothed sector $i$, the crank $m$, provided with the toothed sector $n$, the track-lever E, and the connecting-rod D, substantially as specified.

4. In an automatic switch, the combination of the shaft C, crank $g$ and toothed sector $i$, carried by the said shaft, the shaft $l$, crank $m$, and sector $n$, mounted on the said shaft, the arms $j$ $k$, and the lever $q$, substantially as specified.

5. In an automatic switch, the combination of the base provided with the notches $r$ $s$, the shaft C, crank $g$ and toothed sector $i$, carried by the said shaft, the shaft $l$, the crank $m$, and sector $n$, mounted on the said shaft, the arms $j$ $k$, and the jointed lever $q$, adapted to drop into the notches $r$ $s$, substantially as specified.

6. In an automatic switch, the combination of the base provided with the notches $r$ $s$, the shaft C, crank $g$ and toothed sector $i$, carried by the said shaft, the shaft $l$, the crank $m$, and sector $n$, mounted on the said shaft, the arms $j$ $k$, the jointed lever $q$, adapted to drop into the notches $r$ $s$, the right-angled lever F, the rod G, and the track-lever H, substantially as specified.

7. In an automatic switch, the combination of the base provided with the notches $r$ $s$, the shaft C, crank $g$ and toothed sector $i$, carried by the said shaft, the shaft $l$, the crank $m$, and sector $n$, mounted on the said shaft, the arms $j$ $k$, the rod $u$, spring $w$, the jointed lever $q$, adapted to drop into the notches $r$ $s$, the right-angled lever F, the rod G, and the track-lever H, substantially as specified.

JAMES B. SUFFERN.

Witnesses:
JACOB E. VANDERBILT,
J. E. VAN HORNE.